United States Patent
Durrum et al.

(10) Patent No.: US 6,339,521 B1
(45) Date of Patent: Jan. 15, 2002

(54) DUAL AIR VANE ACTUATOR LATCH APPARATUS FOR A DISC DRIVE

(75) Inventors: Thomas M. Durrum, Broomfield; Gary F. Kelsic, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/472,639

(22) Filed: Dec. 27, 1999

Related U.S. Application Data

(60) Provisional application No. 60/130,300, filed on Apr. 21, 1999.

(51) Int. Cl.$^7$ .............................. G11B 21/22; G11B 5/54
(52) U.S. Cl. .................................................... 360/256.1
(58) Field of Search ............................. 360/256.1, 256, 360/256.6, 254, 250, 240, FOR 205

(56) References Cited

U.S. PATENT DOCUMENTS

| | | | |
|---|---|---|---|
| 4,538,193 A | 8/1985 | Dimmick et al. | 360/256.1 |
| 4,647,997 A | 3/1987 | Westwood | 360/256.1 |
| 4,692,829 A | 9/1987 | Campbell | 360/256.1 |
| 5,036,416 A | 7/1991 | Mastache | 360/256.1 |
| 5,274,519 A | 12/1993 | Saito et al. | 360/254.3 |
| 5,319,511 A * | 6/1994 | Lin | 360/256.1 |
| 5,555,146 A | 9/1996 | Hickox et al. | 360/256.4 |
| 5,768,058 A * | 6/1998 | Hofland | 360/256.1 |

* cited by examiner

Primary Examiner—Hoa T. Nguyen
Assistant Examiner—Julie Anne Watko
(74) Attorney, Agent, or Firm—John B. Phillips; Merchant & Gould P.C.

(57) ABSTRACT

An apparatus for increasing the operative force on an air vane latch apparatus in a disc drive involves providing an additional air vane on the pivoting air filter/latch to provide more torque on the latch during low pressure operating conditions and/or when less than an optimum number of discs are installed in the disc drive. The additional air vane is positioned beneath a top disc in the disc stack to at least catch wind generated adjacent the underside surface of the disc by the rotation of the top disc. The wind so generated pushes against this additional air vane supplementing that generated by the upper air vane thus increasing the torque applied to the pivoting air filter by the wind to ensure that there is sufficient wind pressure accumulation against the air vane and air filter latch to unlatch the actuator during all conditions of normal disc drive operation.

14 Claims, 4 Drawing Sheets

DUAL AIR VANE ACTUATOR LATCH APPARATUS FOR A DISC DRIVE

RELATED APPLICATIONS

This application claims the benefit of priority of U.S. Provisional Patent Application Serial No. 60/130,300 entitled "DUAL AIR VANE", filed Apr. 21, 1999.

FIELD OF THE INVENTION

This application relates to magnetic disc drives and more particularly to an apparatus for latching a disc drive actuator mechanism in a parked position when the drive is de-energized.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

When the drive is de-energized or shut down, the drive motor stops spinning and the actuator is rotated, for example, counterclockwise to position the heads at an inner diameter landing zone location and latch the actuator in this position. Often a magnetic latch is used to maintain the actuator in this position with the heads in the landing zone. When a magnetic latch is used, an inadvertent external shock load, such as the drive being dropped, may cause sufficient rotational force to be applied to the actuator arms to overcome the magnetic attraction and thus the actuator arm may rotate from the landing zone to the data region of the discs without the discs spinning at all. This could destroy the stored data and could destroy the heads themselves. Consequently there is a need for a latch mechanism that ensures that the actuator stays in the parked position any time that the disc drive motor is deenergized and, more importantly, the discs are not spinning.

This deenergized latching has been traditionally accomplished by a wind operated latching mechanism which utilizes wind generated by the spinning discs while the drive motor is energized to push against a pivoting air filter member positioned adjacent the outer margin of the discs. This air filter member has a pivot portion, an air filter portion, and an elongated air vane which extends outward over the top disc in the disc stack. Air drawn along the surface of the disc toward the outer disc rim constitutes a wind that generates a force which pushes against the air vane producing a moment arm in a clockwise direction on the pivoting air filter member. At the other end of the pivot portion of the air filter member is an elongated latch arm and a tab portion that carries a steel ball therein. The steel ball in the tab portion is positioned in the magnetic field generated by the VCM magnets and thus biases the latch counterclockwise such that the latch arm interferes with movement of the actuator arm off of the magnetic latch when the drive is deenergized.

The operation of this conventional latch mechanism is completely automatic, driven only by the VCM magnet magnetic field bias and the force exerted by wind against the air filter and air vane when the discs are spinning at normal speed. The size and placement of the steel ball on the tab portion are dictated by the requirement that the latch be disengaged when the discs are operating at full speed and engaged when the discs are turning at less than full operating speed with the actuator arm moved into the parked position.

The conventional air vane design has worked well for drives with three or four or more operating discs in the head disc assembly (HDA). However, in the case of drives designed for four discs and having only one or two discs installed in the HDA, there have been cases where the air vane latches failed to rotate and move to the disengaged position when the drive is energized, thus preventing actuator movement and appearing to the user by the software as a disc crash or disc drive failure. In these cases, the failures appear to have occurred at high altitudes and/or elevated temperatures, i.e. under conditions of reduced atmospheric pressure. Accordingly, there is a need for a wind operated latching apparatus for use in disc drives having only one or two discs which automatically disengages the actuator arm when the disc drive motor spins the discs at operating speed and engages the actuator arm when the disc or discs spin at less than operating speed and the actuator arm is in the parked position in a head disc assembly (HDA) designed to accommodate up to four or more discs.

SUMMARY OF THE INVENTION

Against this backdrop the present invention has been developed. The present invention is an air filter having a dual air vane arrangement with one air vane adapted to extend over the upper surface of a top disc on the disc drive motor and another, supplemental air vane beneath the top disc adapted to extend under the underside surface of the top disc. This arrangement provides an additional moment arm on the pivoting air filter when only one or two discs are located on the drive motor in the HDA. This supplemental air vane is positioned adjacent the outer perimeter of the disc or discs and extends from the air filter portion of the latch member thus capturing additional air flow and thus providing an additional moment arm on the air filter latch when the drive is utilized at high elevations where the air is thinner or at elevated temperatures at which the air is less dense. This additional air vane permits a larger steel ball to be utilized in the latch apparatus thereby ensuring more positive latch and unlatch operations of the apparatus.

These and various other features as well as advantages which characterize the present invention will be apparent from a reading of the following detailed description and a review of the associated drawings.

DETAILED DESCRIPTION

Figure 1:
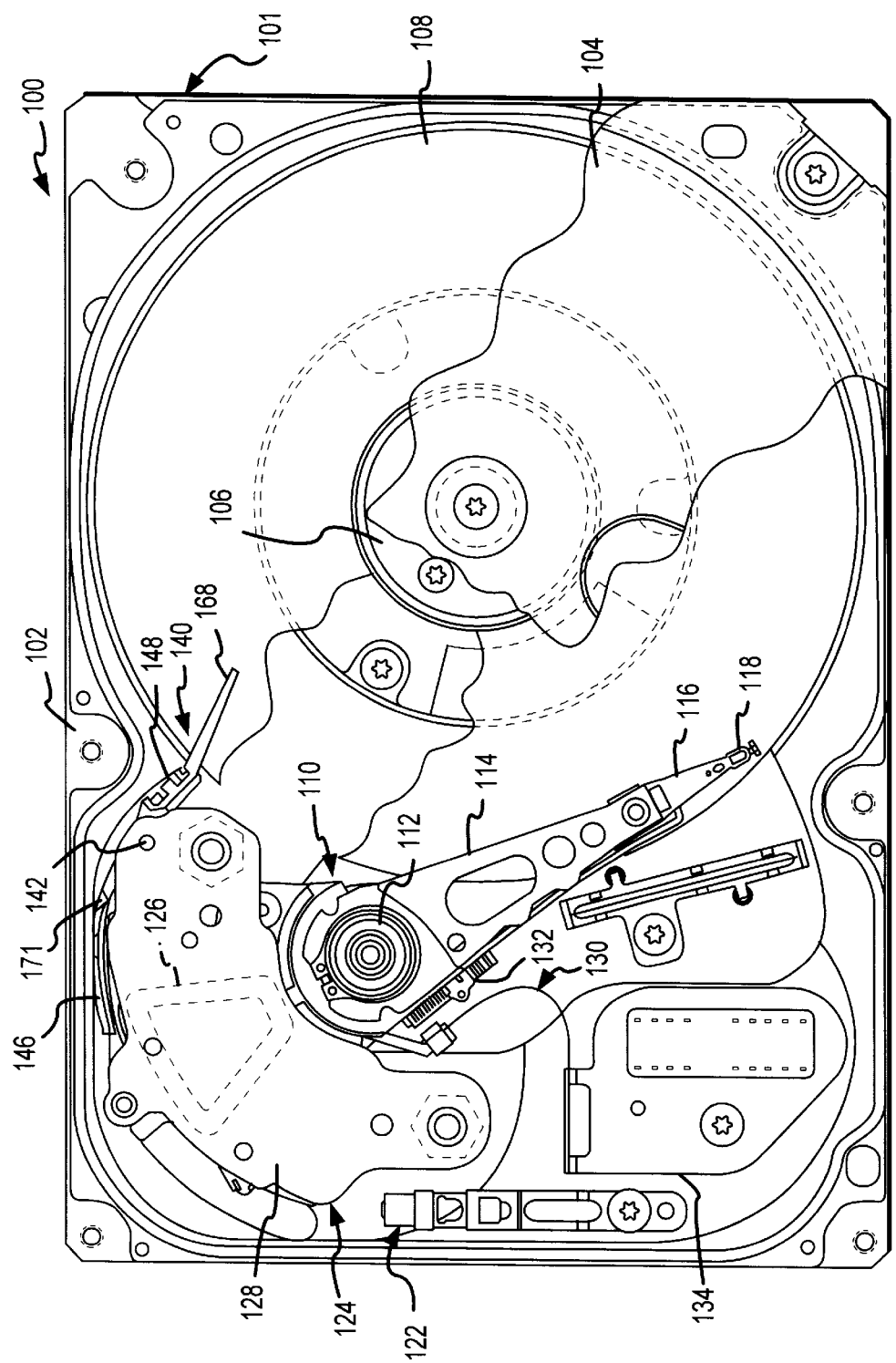
FIG. 1 is a plan view of a disc drive incorporating a dual air vane actuator latch apparatus in accordance with a preferred embodiment of the invention with the head disc assembly cover partially broken away and with portions of the discs broken away.

A disc drive 100 constructed in accordance with a preferred embodiment of the present invention is shown in a plan view with portions broken away in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA) 101. The components include a spindle motor 106 that rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity adjacent the corresponding surface of the associated disc 108.

Figure 3:
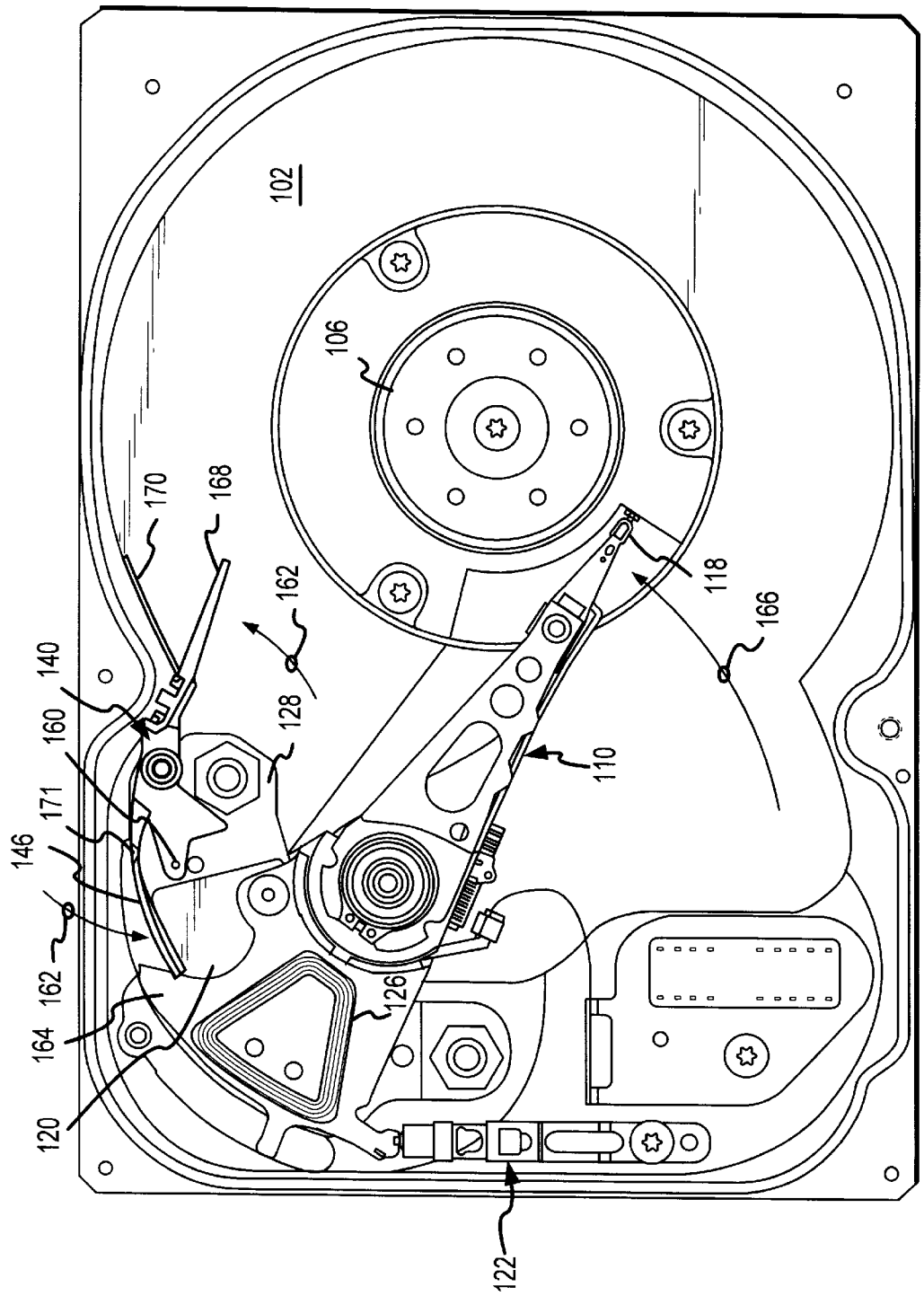
FIG. 3 is a plan view of the disc drive as in FIG. 2 showing the actuator parked with the latch apparatus in an engaged position as when the drive motor is de-energized.

The spindle motor 106 is typically de-energized when the disc drive 100 is turned off or not in use for extended periods of time. The heads 118 are moved to park zones near the inner diameter of the discs 108 when the drive motor is de-energized as shown in FIG. 3. The heads 118 are secured in the park position through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets 120 on return plates 128 which are spaced apart. The magnets and return plates establish a vertical magnetic field between the magnets in which the coil 126 is immersed and suspended for rotation in a horizontal plane between the magnets. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a preamplifier printed circuit board 132 to which head wires (not shown) are connected; the head wires being routed along the actuator arms 114 and the flexures 116 to the heads 118. The preamplifier printed circuit board 132 typically includes circuitry for controlling the write currents applied to the heads 118 during a write operation and for amplifying read signals generated by the heads 118 during a read operation. The flex assembly 130 terminates at a flex bracket 134 for communication through the base plate 102 to a disc drive printed circuit board (not shown) mounted to the bottom side of the disc drive 100.

A pivoting dual air vane air filter and latch apparatus 140 in accordance with the present invention is pivotally supported on a pin 142 projecting from one of the magnet return plates 128. The latch apparatus 140 is shown in FIGS. 1 and 2 rotated clockwise to a disengaged position as would be the case when the drive 100 is at normal operation with the discs 108 rotating at normal speed.

Figure 2:
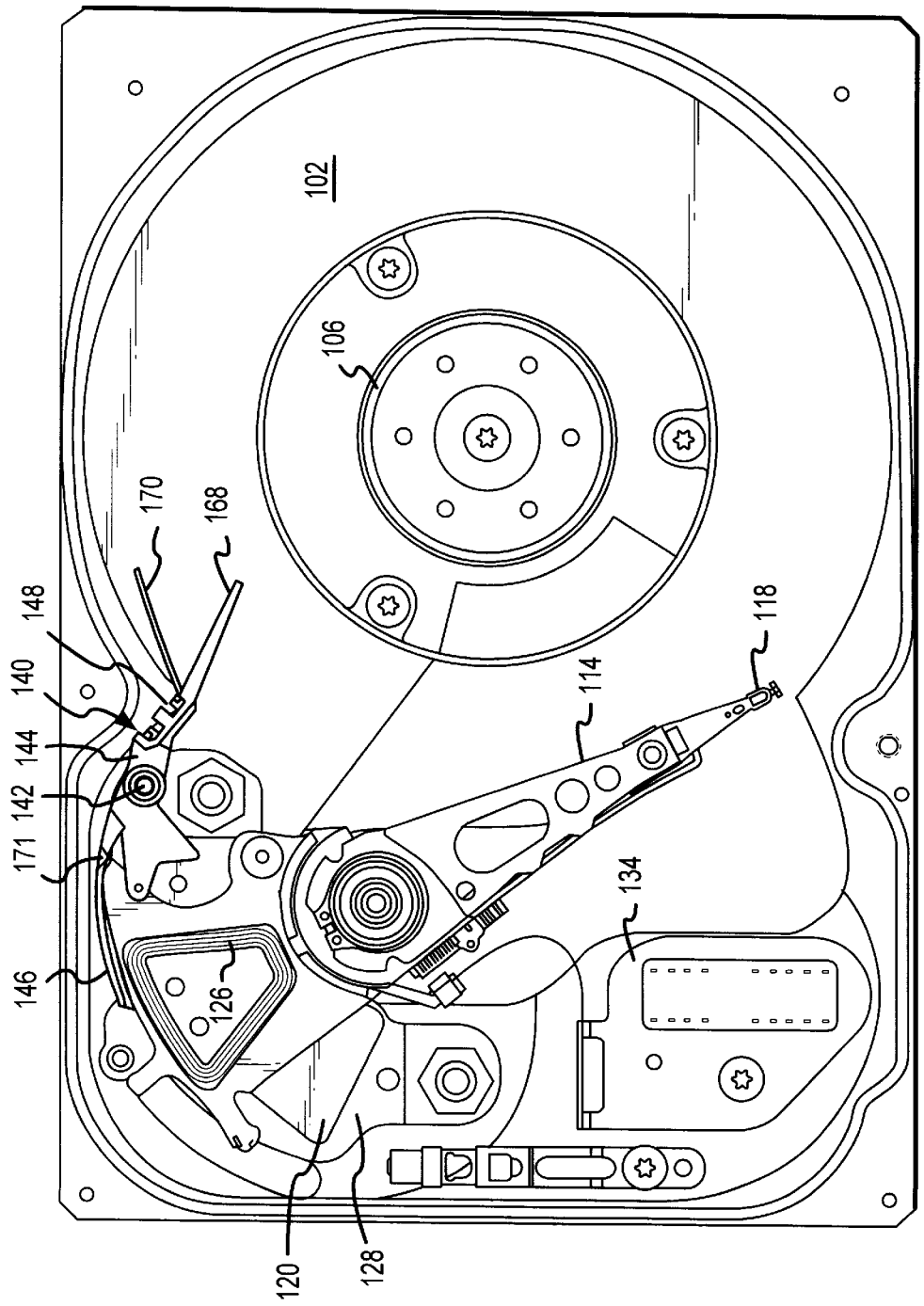
FIG. 2 is a plan view of the disc drive shown in FIG. 1 with the voice coil motor upper magnets and magnet return plate removed and the data disc(s) removed, showing the latch apparatus in accordance with a preferred embodiment of the present invention in a disengaged position, that occurs when the discs are spinning at normal speed, permitting the actuator to rotate to position the read/write heads over the data portion of the disc.
Figure 4:
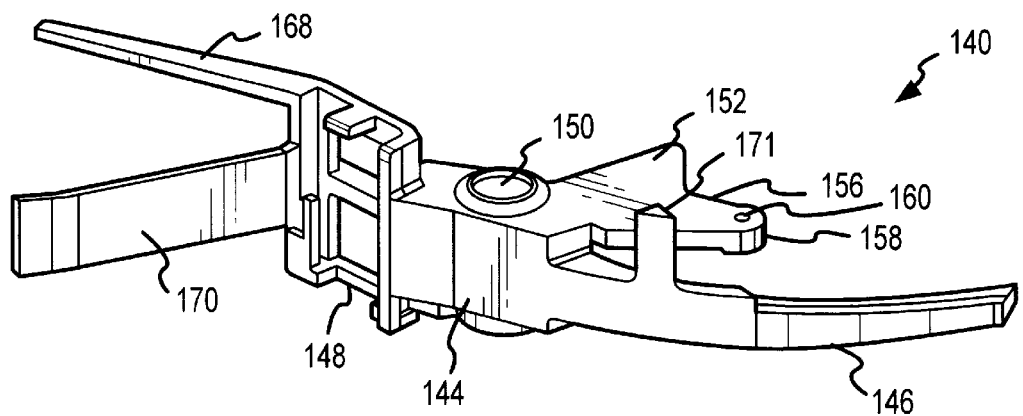
FIG. 4 is a separate, enlarged, perspective upper view of the air vane latch apparatus of the present invention.
Figure 5:
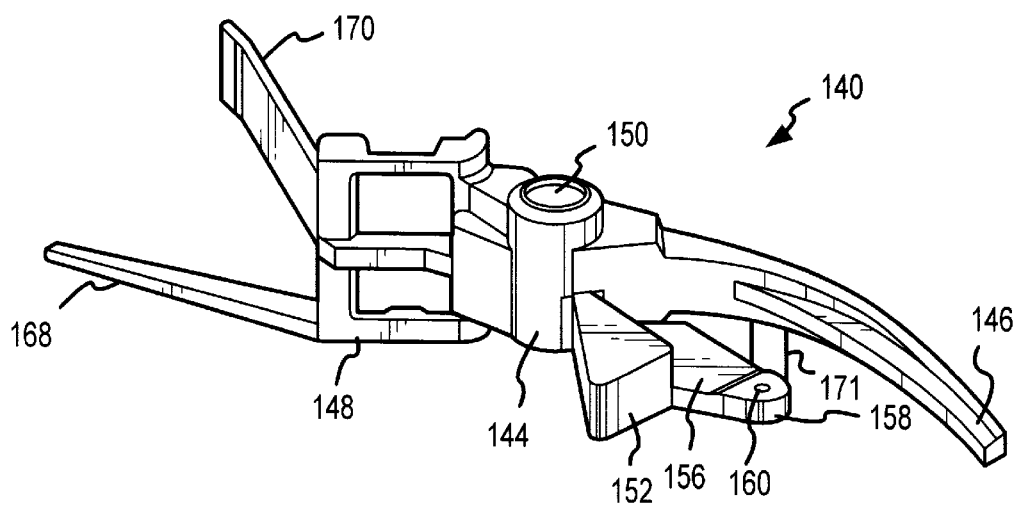
FIG. 5 is a separate, enlarged, perspective bottom view of the latch apparatus in accordance with the present invention shown in FIG. 4.

The dual air vane air filter and latch apparatus 140 in accordance with a preferred embodiment of the present invention is shown in the drive 100 clearly in FIGS. 2 and 3 and in the separate views of FIGS. 4 and 5. Note that in FIGS. 2 and 3 the upper magnets and return plate 128 and the disc(s) 108 have been removed for clarity.

Referring now to FIGS. 4 and 5, the dual air vane air filter and latch apparatus 140 is shown in separate upper and lower perspective views. Apparatus 140 is an injection molded body having an elongated, generally cylindrical tubular pivot portion 144, an elongated latch arm 146 extending generally radially from one side of the pivot portion 144 and an air filter bracket 148 supported from and extending from an opposite side of the pivot portion 144. The filter bracket 148 forms an open rectangular frame support for a sheet of air filter media (not shown).

The cylindrical pivot portion 144 has an axial through bore 150 sized to receive the pivot pin 142 therein permitting rotation of the apparatus 140 about the axis of the bore 150. A flat, counterbalance tab portion 152 extends laterally and radially outward from the pivot portion 144 adjacent the latch arm 146. A clocking tab 171 projecting upward from the upper surface of the latch arm 146 engages a stop located on the top magnet return plate 128 to limit counterclockwise rotation of the apparatus 140 about the pivot pin 142. In addition, a generally flat, tapered biasing arm member 156 extends from the tab portion 152 so that its tip extends into the magnetic field generated by the VCM magnets 126 when the apparatus is installed on the pivot pin 142. A steel ball 160 is mounted adjacent the tip 158 in the biasing arm 156. This ball 160 is in the magnetic field and is located on the biasing arm 156 a predetermined distance from the axis of the pivot portion 144.

The magnetic field of the VCM interacts with the ball 160 to provide a torque on the apparatus 140 in a counterclockwise direction, as viewed from the top as in FIG. 1. Thus the apparatus 140 is constantly biased as shown by the arrows 162 in FIG. 3, toward engagement of the latch arm 146 with the actuator coil overmold 164 to prevent movement of the actuator assembly 110 off of the magnetic latch 122 when it is latched. The actuator assembly 110 is rotated as shown by the arrow 166 to a latched position when the drive 100 is de-energized. The actuator arms 114 rotate fully counterclockwise to a park position as shown in FIG. 3 which positions the heads 118 over the landing zone on the disc 108 (not shown in FIG. 3). In this position, when the discs are stopped or are spinning at less than operational speed, the coil overmold 164 is then captured between the latch 122 and the latch arm 146, thus ensuring that the heads 118 stay in the landing zone.

Referring back now to FIGS. 4 and 5, the air filter bracket 148 has one side joined with the pivot portion 144. An air vane 168 extends outward from the other side of the air filter bracket 148. This air vane 168 is positioned so as to rotate over the upper surface of the disc 108 as shown in FIGS. 1 and 2. The air vane 168 is also positioned just above the upper surface of the disc so that it is in the path of wind generated by the rotating disc 108 during normal drive operation. This wind exerts a force on the air vane 168 tending to rotate the apparatus 140 clockwise in opposition to the magnetic torque on the apparatus 140 generated by the interaction of the ball 160 in the magnetic field of the VCM. When the wind force against the air vane 168 and the air filter in the bracket 148 exceeds the torque from the ball 160, the apparatus 140 will rotate clockwise, permitting the latch arm 146 to disengage the actuator coil overmold 164. The VCM can then rotate the actuator arms 114 from the park position to the data region of the disc.

However, in environmental conditions having reduced air pressure, such as at elevated temperatures above about 25° Centigrade, or at high altitudes generally above about 14,000 feet, and with a reduced number of discs in the drive, the wind generated by normal operation of the drive motor is insufficient to cause rotation of the apparatus 140. Therefore, there is another air vane 170 that extends from the air filter bracket 148. The second or lower air vane 170 is a generally rectangular body that extends horizontally beneath the disc 108 parallel to the plane of the disc 108 but at an acute skew angle to the air vane 168 such that the upper air vane 168 extends initially further into the path of the wind than the lower air vane 170. The angle is preferably chosen such that the air vane and air filter latch apparatus 140 can preferably be installed in the drive 100 during drive assembly after the disc or discs 108 have been installed on the motor 106 on the baseplate 102. That is, the lower air vane 170 is preferably positioned outside the diameter of the disc or discs 108 when the apparatus 140 has been rotated to a latched position as shown in FIG. 3.

The lower air vane 170 is preferably oriented normal to the plane of the disc 108 and is preferably also wider than the upper air vane so as to present a larger surface area than the upper air vane against which the wind generated by the rotating disc 108 exerts a force. The second or lower air vane 170 extends from the bracket in a direction normal to the pivot axis and parallel to the plane of the disc 108 such that the upper and lower air vanes 168 and 170 are vertically spaced apart and sandwich the disc 108 therebetween.

The two vane design, with air vanes 168 and 170 being at different skew angles with respect to the pivot portion 144, provides the ability of the air vanes to capture two different air streams. The air vane 168 catches air from the shearing effect of the large top disc surface. The lower vane 170 is positioned to catch air that is pumped out to the outer edge of the disc 108 from the centrifugal effect. This caught air is then constrained and directed by the topography of the cover 104 onto the lower air vane 170.

The presence of the second lower air vane 170 also permits a larger size of ball 160 to potentially be utilized in the drive 100 since the total wind force on the two air vanes is greater and thus the torque generated by the disc rotating at normal operational speed is generally greater than in conventional air vane air filter and latch arrangements. This results in an improvement in the tendency for the apparatus 140 to stay in either the latched or unlatched positions, thus providing more positive latching and unlatching when the disc or discs 108 reach operating speed.

In summary the present invention may be viewed as a disc drive (such as 100) having a head disc assembly (such as 101) sized to accommodate up to four data storage discs (such as 108) therein, the head disc assembly (such as 101) having a baseplate (such as 102) and one or two data storage discs rotatably mounted on a spin motor (such as 106) fastened to the baseplate (such as 102) and an actuator assembly (such as 110) mounted adjacent the data storage disc (such as 108) in the head disc assembly (such as 101) for rotating an actuator arm (such as 114) over a portion of the disc (such as 108), and a wind actuated air filter and latch apparatus (such as 140) operable at reduced air pressure such as at elevated temperatures and elevations in excess of 14,000 feet. The wind actuated air filter and latch apparatus has a pivot portion (such as 144) rotatably mounted in the disc drive adjacent the disc. The latch (such as 146) rotates from a latched position, in which the heads (such as 118) are in a park position, preventing movement of the actuator arm (such as 114) to an unlatched position permitting movement of the actuator arm (such as 114) only when the spin motor rotates the data storage disc (such as 108) at a speed approaching normal operating speed.

The wind actuated air filter and latch apparatus (such as 140) has a unitary body having a pivot portion (such as 144) rotatably mounted in the disc drive adjacent the disc (such as 108) on a stationary pivot pin (such as 142) and a latch arm member (such as 146) extending from one side of the pivot portion (such as 142) toward the actuator assembly (such as 110). The apparatus (such as 140) also has an air filter bracket (such as 148) extending from another side of the pivot portion (such as 142) for holding an air filter in a path of wind generated by the disc (such as 108) and exert a rotational force on the unitary body, an upper air vane member (such as 168) extending outward from the bracket (such as 148) over a portion of the disc to catch the wind and exert a rotational force on the pivot portion (such as 144), and a lower air vane member (such as 170) extending from the bracket (such as 148) beneath the upper air vane member parallel to the upper air vane member (such as 168) to also catch the wind and exert an additional rotational force on the pivot portion (such as 144). The upper and lower air vane members (such as 168 and 170) sandwich a portion of the disc (such as 108) between them.

Viewed another way, the present invention preferably is a dual air vane air filter and latch apparatus (such as 140) for use in a disc drive (such as 100) wherein the drive has one or two data storage discs (such as 108) rotatably mounted on a spin motor (such as 106) fastened to a baseplate, an actuator assembly (such as 110) mounted adjacent the data storage disc (such as 108) for rotating an actuator arm (such as 114) over a portion of the disc. The dual air vane air filter and latch apparatus (such as 140) includes a unitary body having a pivot portion (such as 144) rotatably mounted in the disc drive (such as 100) adjacent the disc (such as 108). A latch arm member (such as 146) extends from one side of the pivot portion (such as 144) toward the actuator assembly (such as 110) for engaging the actuator assembly (such as 110). An air filter bracket (such as 148) extends from another side of the pivot portion (such as 144). The bracket (such as 148) holds an air filter in a path of wind generated by the disc (such as 108) when the disc (such as 108) rotates at a normal operating speed. An upper air vane member (such as 168) extends outward from the bracket (such as 148). The upper air vane member (such as 168) is adapted to extend over a portion of one disc. A lower air vane member (such as 170) extends from the bracket (such as 148) beneath the upper air vane member (such as 168) parallel to the upper air vane member. The lower air vane member (such as 170) is wider than the upper air vane member (such as 168). The lower air vane member such as 170) also extends from the bracket (such as 148) at an acute angle from the upper air vane member. The upper and lower air vane members (such as 168 and 170) are vertically spaced apart so that they sandwich a portion of the disc (such as 108) between them, and both catch wind generated by the rotating disc to exert a rotational force, or torque, on the pivot portion (such as 144).

The pivot portion (such as 144) has a through bore (such as 150) adapted to receive a stationary pivot pin (such as 142) mounted in the disc drive (such as 100). The pivot pin (such as 142) and the through bore (such as 150) has a central pivot axis extending parallel to the axis of rotation of the disc (such as 108) and the upper and lower vane members (such as 168 and 170) extend outward from the bracket (such as 148) each in a plane normal to the pivot axis.

Stated another way, the present invention preferably is a disc drive (such as 100) that has one or more data storage discs (such as 108) rotatably mounted on a spin motor (such as 106) fastened to a baseplate (such as 102) and an actuator assembly (such as 110) mounted adjacent the data storage disc for rotating an actuator arm (such as 114) over a portion of the disc. The disc drive (such as 100) includes a dual air vane air filter and latch apparatus (such as 140) having a unitary body having a pivot portion (such as 144) rotatably mounted in the disc drive (such as 100) adjacent the at least one disc (such as 108) on a stationary pivot pin (such as 142). A latch arm member (such as 146) extends from one side of the pivot portion (such as 144) toward the actuator assembly (such as 110) and prevents rotation of the actuator arms (such as 114) unless the disc is rotating at or near normal operational speed. An air filter bracket (such as 148) extends from another side of the pivot portion (such as 144) for holding an air filter in a path of wind generated by the at least one disc (such as 108) when the disc is rotating at a normal operating speed. An upper air vane member (such as 168) extends outward from the bracket (such as 148) which is adapted to extend over a portion of the disc (such as 108) and a lower air vane member (such as 170) extends from the bracket beneath the upper air vane member (such as 168) parallel to the upper air vane member (such as 168). The lower air vane member (such as 170) has a width greater than a width of the upper air vane member (such as 168) and the lower air vane member (such as 170) extends from the air filter bracket (such as 148) at an acute angle from the upper air vane member (such as 168). Further, the upper and lower air vane members (such as 168 and 170) are vertically spaced apart. The vane members (such as 168 and 170 extend into the path of wind generated by the rotating disc (such as 108) so as to exert a torque on the pivot portion (such as 144) as the rotating disc approaches normal operating speed, to rotate the latch member 146 out of engagement with the actuator assembly (such as 110).

The pivot portion (such as 144) has a through bore (such as 150) adapted to receive the stationary pivot pin (such as 142) mounted in the disc drive (such as 100). The through bore (such as 150) has a central pivot axis and the upper and lower vane members (such as 168 and 170) extend outward from the air filter bracket (such as 148) each in a plane normal to the pivot axis and the upper and lower vane members (such as 168 and 170) sandwich the disc (such as 108) between them.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, as just stated above, the second air vane permits a larger ball 160 to be used. The material utilized to form the apparatus 140 may be any suitable material. The shape of the second air vane may also differ from that illustrated. These are only representative changes and various other size, shape and configuration changes may be readily apparent. Accordingly, all such modifications, changes and alternatives are encompassed in the spirit of the invention disclosed and as defined in the appended claims.

What is claimed is:

1. A dual air vane latch apparatus for use in a disc drive having a data storage disc rotatably mounted on a spin motor fastened to a baseplate and an actuator assembly mounted adjacent the data storage disc for rotating an actuator arm over a portion of the disc, the dual air vane latch apparatus comprising:

a pivot portion adapted to be rotatably mounted in the disc drive adjacent the disc, the pivot portion rotatable between a latched position and an unlatched position;

a latch arm extending from the pivot portion toward the actuator assembly, the latch arm adapted to contact the actuator assembly to prevent movement of the actuator arm when the pivot portion is rotated to the latched position, and the latch arm further adapted to avoid contact with the actuator assembly to allow free movement of the actuator arm when the pivot portion is rotated to the unlatched position;

an upper air vane extending from the pivot portion for rotation in a first plane and adapted to catch air flow generated by the rotating disc to exert a rotational force on the pivot portion toward the unlatched position, the upper air vane adapted to extend over a top surface of the disc when the pivot portion is rotated to both the latched and the unlatched positions; and a lower air vane extending from the pivot portion for rotation in a second plane parallel to the first plane and adapted to catch air flow generated by the rotating disc to exert a rotational force on the pivot portion toward the unlatched position, the lower air vane extending from the pivot portion at a skew angle with respect to the upper air vane so that the lower air vane is adapted to be positioned outside an outer diameter of the disc when the pivot portion is rotated to the latched position.

2. The apparatus of claim 1 wherein the upper and lower air vane members are vertically spaced apart and are adapted to sandwich a portion of the disc therebetween when the pivot portion is rotated to the unlatched position.

3. The apparatus of claim 2 further comprising:
an air filter bracket having a first side extending from the pivot portion, wherein the upper and lower air vanes both extend from a second side of the air filter bracket opposite the first side.

4. The apparatus of claim 2 wherein the upper air vane defines a lateral face oriented parallel to the first plane, the lateral face adapted to receive shear forces from air flowing adjacent the top surface of the disc.

5. The apparatus of claim 4 wherein the lower air vane defines a vertical face oriented normal to the second plane, the vertical face adapted to catch air flow following a peripheral edge of the disc.

6. The apparatus of claim 5 wherein the vertical face of the lower air vane is adapted to catch air flow channeled by a top cover of the disc drive.

7. A disc drive comprising:
a spin motor fastened to a baseplate;
a data storage disc rotatably mounted on the spin motor;
an actuator assembly mounted adjacent the data storage disc for rotating an actuator arm over a portion of the disc; and
a dual air vane latch rotatable between a latched position and an unlatched position for selectively latching the actuator assembly in a parked position when the spin motor is de-energized, the dual air vane latch comprising:
  a pivot portion rotatably mounted to the baseplate;
  a latch arm extending from the pivot portion toward the actuator assembly, the latch arm contacting the actuator assembly to prevent movement of the actuator arm when the dual air vane latch is rotated to the latched position, and the latch arm positioned away from the actuator assembly to allow free movement of the actuator arm when the dual air vane latch is rotated to the unlatched position;
  an upper air vane extending from the pivot portion for rotation in a first plane, the upper air vane catching air flow generated by the rotating disc and exerting a rotational force on the dual air vane latch toward the unlatched position, the upper air vane extending over a top surface of the disc when the dual air vane latch is rotated to both the latched and the unlatched positions; and
  a lower air vane extending from the pivot portion for rotation in a second plane parallel to the first plane, the lower air vane catching air flow generated by the rotating disc and exerting a rotational force on the dual air vane latch toward the unlatched position, the lower air vane extending from the pivot portion at a skew angle with respect to the upper air vane so that the lower air vane is positioned outside an outer diameter of the disc when the dual air vane latch is rotated to the latched position.

8. The disc drive of claim 7, wherein the spin motor and the data storage disc are fastened to the baseplate before the pivot portion of the dual air vane latch is mounted to the baseplate.

9. The disc drive of claim 7 wherein the upper and lower air vane members are vertically spaced apart and sandwich a portion of the disc therebetween when the dual air vane latch is rotated to the unlatched position.

10. The disc drive of claim 9 wherein the dual air vane latch further comprises:
an air filter bracket having a first side extending from the pivot portion, wherein the upper and lower air vanes both extend from a second side of the air filter bracket opposite the first side.

11. The disc drive of claim 9 wherein the upper air vane defines a lateral face oriented parallel to a plane of the disc so that the lateral face receives shear forces from air flowing adjacent the top surface of the disc.

12. The disc drive of claim 11 wherein the lower air vane defines a vertical face oriented normal to the plane of the disc so that the vertical face catches air flow following a peripheral edge of the disc.

13. The disc drive of claim 12 wherein the vertical face of the lower air vane catches air flow channeled by a top cover of the disc drive.

14. A disc drive having a data storage disc rotatably mounted on a spin motor and an actuator assembly mounted adjacent the data storage disc for rotating an actuator arm over a portion of the disc, the disc drive comprising:
a dual air vane latch apparatus for selectively latching the actuator assembly in a parked position when the spin motor is de-energized, the apparatus having a pivot portion rotatably mounted in the disc drive adjacent the disc, a latch arm member extending from one side of the pivot portion toward the actuator assembly, and upper and lower air vanes extending from an opposite side of the pivot portion; and
means for mounting the dual air vane latch in the disc drive after the spin motor and the data storage disc have been secured within the disc drive.

* * * * *